Patented July 10, 1934

1,966,162

UNITED STATES PATENT OFFICE 1,966,162

DIELECTRIC FOR ELECTRICAL DEVICES

Frank M. Clark, Pittsfield, Mass., assignor to General Electric Company, a corporation of New York No Drawing. Application February 1, 1930, Serial No. 425,359

15 Claims. (Cl. 175—41)

The present invention comprises a new dielectric material for use in electrical devices which is particularly well adapted for employment in electric capacitors, either alone or in combination with other dielectric materials.

In my U. S. Patent 1,895,376 patented January 24, 1933, I have described and claimed electric capacitors provided with a dielectric organic ester containing a phosphoric acid radical, such, for example, as tricresyl phosphate, tributyl phosphate, triethyl phosphate and triphenyl phosphate. The first three mentioned are liquids at ordinary temperatures, the last mentioned being solid.

The present invention is based on the discovery that when ester phosphates are heated to temperatures above 105° C. and preferably to 150 to 160° C. that chemical changes occur therein which greatly increase their specific inductive capacity and otherwise modify their properties.

In carrying out my invention, an ester phosphate, such as obtainable in the open market, first is purified by filtration through a suitable absorbent material such as fullers earth, silica gel or the like in order to improve its dielectric properties by the removal of water and other impurities. After filtration the phosphate is heated for about 2 to 10 hours at a temperature within the range of about 105 to 165° C., the lower temperature within this range corresponding to the longer time given in the above range, and conversely, the higher temperatures requiring only a shorter time.

The dielectric constant of a phosphate which has been subjected to this heat treatment is increased, apparently by the formation of pyrogenic decomposition products formed during the heat treatment. The nature of the effective decomposition product depends on the character of the ester which is being treated. For example, when tricresyl phosphate is heated as above described cresol is one of the principal decomposition products which is effective in improving the dielectric properties of the material. On the other hand, when triphenyl phosphate is heated as described phenol is the principal effective decomposition product.

The dielectric constant before heat treatment of tricresyl phosphate is in the neighborhood of 6 or 7. After heat treatment its dielectric constant is materially increased. The resistance of the phosphate is lowered somewhat but is still very high being about $1 \times 10^8$ ohms per cm. cube. The power factor of the material is increased, being about 2 to 4% before heat treatment and in some cases as high as 25 to 30% after heat treatment. The increase in power factor is of no significance when capacitors in which the heat treated material is used is intended for intermittent or direct current service, for example, in the use of starting the circuits for high torque motors or for radio application.

The advantages of electric capacitors in which my invention is embodied may be appreciated from the following consideration of a form of commercial capacitor which is employed on 220 volt power circuits. Such capacitor has dimensions of about 3½x4¼x5 inches. It contains aluminum foil electrodes separated by paper, three thicknesses of .4 mil paper being employed. When impregnated with tricresyl phosphate which has not been heat treated such capacitor has a capacity of 35 microfarads. When impregnated with heat-treated tricresyl phosphate such capacitor has a capacity of 65 microfarads, an increase of about 85 per cent.

If, on the other hand, no increase of electric capacity is desired, the physical size of capacitors impregnated with heat-treated tricresyl phosphate may be reduced. A 220 volt one microfarad capacitor, impregnated with tricresyl phosphate which has not been heat treated, has a dimension of about 2.1 cu. in. A one microfarad capacitator impregnated with heat-treated tricresyl phosphate has a cubical dimension of 1.1 cu. in.

The power factor of the heat-treated phosphate ester may be materially decreased by subjecting a capacitor impregnated therewith to fused paraffin wax. For example, a capacitor containing paper insulation which has been impregnated with a heat-treated phosphate ester may be immersed in a bath of paraffin wax having a temperature of 165° C. for about one hour. Some of the phosphate ester appears to be displaced by the wax but much of it remains as is evidenced by its appearance when subjecting the capacitor to pressure. By the wax treatment the power factor of capacitors impregnated with heat-treated phosphate ester is lowered in all cases to below 15% and in some cases is lowered to 7% or even lower.

When paper is used as a dielectric between the plates of a capacitor, it is desirable in some cases to impregnate the paper before assembly with a water solution of an inorganic salt, such as calcium sulphate or sodium phosphate, the paper preferably then being dried in air. A capacitor built up with paper thus impregnated as dielectric material is filled with tricresyl phosphate, or other heat treated phosphoric ester, in accordance with my invention. In some cases the capacitor as a whole made up with paper dielectric may be impregnated with an inorganic salt. Prior treatment of the paper with such salt decreases the power factor of a capacitor containing it without materially affecting its electrical capacity.

The ester dielectric may be used with various forms of absorbent solid dielectric material other than paper. For example, there may be employed with success an electrode material aluminum foil which has been oxidized by chemical treatment with or without the conjoint action of electrolysis to produce on the aluminum foil a layer of aluminum oxide.

In some cases the phosphate ester employed for impregnation may be admixed with paraffin wax as by solution of the wax therein at a temperature of about 100 to 150° C. and the capacitor then may be impregnated by the mixture. The proportion of the wax may be widely varied,—say from 2 to 75 per cent. Upon solidification a solid solution is produced comprising wax in which the liquid ester is dispersed.

Such mixtures in capacitors have the advantages of lower cost by the elimination of clamping devices for the electrode plates and avoid the danger of loss of dielectric material by leakage. Various other forms of waxy material may be used as for example shellac wax, or carnauba wax.

The impregnation of capacitors with heat treated ester phosphate may be carried out in accordance with known methods. For example, the capacitors containing paper dielectric between the plates may be first thoroughly dried in assembled condition, preferably in a vacuum, and then the heat treated dielectric may be admitted to the capacitor while in the vacuum. In some cases I may carry out the impregnation of capacitors in accordance with the procedure described in my prior U. S. Patent 1,877,644 patented September 13, 1932, whereby a capacitor is introduced in a body of dielectric material heated to a temperature about 150° C. or above for sufficient length of time to cause the capacitor to assume the temperature of said material, the capacitor then being transferred to a body of dielectric material at a lower temperature, say a temperature of about 80° C. After the capacitor has assumed the temperature of this second body of dielectric, it is finally cooled to room temperature in the open air.

When it is desired to improve or lower the power factor of the capacitor by the action of wax as above described, then the capacitor may be transferred from the high temperature impregnating bath, that is a bath at 150° C. or higher, to a wax bath at a high temperature, say at 150 to 165° C. The capacitor is maintained in this wax bath for about one hour, then is transferred to a wax bath at a lower temperature, say at 80° C. and thereafter is cooled to room temperature as above described. As a result of this treatment both ester phosphate and wax remain in the capacitor.

Very much more favorable results may be obtained in capacitors provided with a heat treated dielectric made in accordance with my invention when the paper dielectric in the capacitors consists of kraft paper than when the dielectric consists of linen paper. In a United States Patent 1,850,702 patented March 22, 1922 in the name of Amos L. Allen, assigned to the same assignee as the present application, is described a kraft paper with a thickness less than .5 mil and the method of its manufacture. I prefer to employ for the purpose of my invention a dielectric between the plates of a capacitor consisting of three layers of .4 mil kraft paper.

A capacitor containing a linen paper dielectric and constructed for 220 volts power circuits having the dimensions of 3½x4½x5 inches with a capacity of 65 microfarads, as described above, has when containing linen paper a power factor of about 20%. A capacitor containing a dielectric of kraft paper has a power factor of about 10 to 12%, the power factor of the kraft paper condenser being lowered still further by treatment in a wax bath as described in the preceding paragraph to about 6 to 10%.

While I have referred herein particularly to tricresyl phosphate, I wish it to be understood that other ester phosphates will form pyrogenic decomposition products and are available for the purposes of my invention.

In my copending application, Serial No. 635,388, filed September 29, 1932, are described and claimed broad aspects of my present invention. In that application, Serial No. 635,388, are claimed capacitors containing semiconductors (of which the heat-treated material herein described constitutes a species) having such electrical resistivity and other electrical properties that capacitors containing such material operate with high efficiencies.

What I claim as new and desire to secure by Letters Patent of the United States, is:

1. An ester phosphate dielectric material containing pyrogenic decomposition products and having a dielectric constant above 7 and a resistivity of about $1 \times 10^8$ ohms per centimeter cube.

2. An electric capacitor impregnated with ester phosphate, containing pyrogenic decomposition products.

3. An electric capacitor containing paper dielectric between its plates, said paper being impregnated with an ester phosphate containing pyrogenic decomposition products and having a dielectric constant above 7.

4. An electric capacitor containing paper dielectric between its plates, said paper being impregnated with tricresyl phosphate containing pyrogenic decomposition products and having a dielectric constant above 7.

5. An electric capacitor provided with kraft paper dielectric impregnated with tricresyl phosphate containing pyrogenic decomposition products and having a dielectric constant above 7.

6. An electric capacitor provided with kraft paper dielectric said paper being impregnated with tricresyl phosphate containing pyrogenic decomposition products and paraffin wax.

7. An electric capacitor provided with a paper dielectric impregnated with tricresyl phosphate containing pyrogenic decomposition products and having about 2 to 75% of paraffine wax dispensed therein.

8. The method of treating an electric capacitor which is provided with an absorbent dielectric material which consists in impregnating said capacitor with heated tricresyl phosphate containing pyrogenic decomposition products, transferring the capacitor while hot to a bath of paraffin wax heated to about 150 to 165° C., and after about one hour maintenance in said heated wax cooling said capacitor to room temperature.

9. A composition of matter containing substantial amounts respectively of paraffin wax, tricresyl phosphate and pyrogenic decomposition products of said phosphate.

10. The method of treating an electric capacitor provided with paper dielectric which consists in impregnating said capacitor at a temperature of about 150° C. in a bath consisting of tricresyl phosphate containing pyrogenic decomposition products for a sufficient length of time for the capacitor to assume the temperature of said bath, then transferring said capacitor to a paraffin wax bath which is heated to about 150 to 165° C., removing said capacitor from the wax bath, and cooling to room temperature.

11. The method of improving the properties of tricresyl phosphate for dielectric purposes which consists in heating said phosphate at a temperature within a range of about 105 to 165° C. for about 10 to 2 hours and until the resistivity of said phosphate has been reduced to about $1 \times 10^8$ ohms per centimeter cubed.

12. The method of improving the properties of tricresyl phosphate for dielectric purposes in capacitors which consists in heating said phosphate to a temperature within a range of about 105 to 165° C. for about 10 to 2 hours to form therein a substantial proportion of decomposition products.

13. A dielectric material consisting of tricresyl phosphate which has been subjected to heating within the range of about 105 to 165° C. until sufficient decomposition products are formed therein in sufficient amount to reduce the resistivity of said phosphate to about $1 \times 10^8$ ohms per centimeter cubed.

14. A composition containing substantial amounts respectively of tricresyl phosphate and pyrogenic decomposition products thereof, said composition having a dielectric constant of about 7 and a resistivity of about $1 \times 10^8$ ohms per centimeter cube.

15. A dielectric material containing substantial amounts respectively of triphenyl phosphate and pyrogenic decomposition products formed in said phosphate by heat within the range of about 105 to 165° C., said material having a lower resistivity than a similar phosphate which has not been thermally decomposed.

FRANK M. CLARK.